United States Patent [19]
Durham et al.

[11] Patent Number: 5,746,517
[45] Date of Patent: May 5, 1998

[54] RETAINING ASSEMBLY FOR ROLLER BEARINGS

[75] Inventors: Darrell Lee Durham, Lee's Summit, Mo.; Mark Anthony Johnson; David Wayne O'Reilly, both of Olathe, Kans.

[73] Assignee: Eskridge, Inc., Olathe, Kans.

[21] Appl. No.: 777,109

[22] Filed: Dec. 30, 1996

[51] Int. Cl.$^6$ ................................................. F16C 43/00
[52] U.S. Cl. ........................ 384/538; 384/561; 384/585; 384/903
[58] Field of Search ........................ 384/517, 537, 384/538, 539, 561, 563, 584, 585, 626, 903

[56] References Cited

U.S. PATENT DOCUMENTS

| | | | |
|---|---|---|---|
| 1,102,404 | 7/1914 | Heinzelman | 384/570 |
| 4,083,613 | 4/1978 | McGee | 384/903 X |
| 4,179,167 | 12/1979 | Lura et al. | 384/538 X |
| 4,336,971 | 6/1982 | Reiter . | |
| 4,385,846 | 5/1983 | Knauss | 384/903 X |
| 4,522,515 | 6/1985 | Miki et al. | 384/571 |
| 4,601,592 | 7/1986 | Jatczak et al. | 384/564 |
| 5,597,242 | 1/1997 | Beeler | 384/538 X |

FOREIGN PATENT DOCUMENTS 2012011  7/1979  United Kingdom .................. 384/584

OTHER PUBLICATIONS

Brochure, 1984, The Timken Company, "Automated Bearing Setting Methods".
Brochure, 1982, The Timken Company, "Acro–Set", illustrating a Means of Setting Tapered Roller Bearings Achieved Through Measurement of a Shim Gap with a Specified Setup Load Applied.
Brochure, 1982, The Timken Company, "Set–Right", illustrating a Means of Setting Tapered Roller Bearings by Applying the Laws of Probability to the Component Tolerances of an Application.
Brochure, 1982, The Timken Company, "Torque–Set", illustrating A Means of Setting Tapered Roller Bearings Achieved by measuring Bearing Roller Torque.
Brochure, 1982, The Timken Company, "Press–Set", illustrating a Means of Setting Tapered Roller Bearings Achieved Through the Aid of a Hydraulic Cylinder and Sensing Device for High Volume Applications.
Brochure, 1982, The Timken Company, "Clamp–Set", illustrating A means of Setting Tapered Roller Bearings Achieved Through the Use of a Compensating Ring.
Brochure, 1984, The Timken Company, "Gauging Concepts for Setting Tapered Roller Bearings", pp. 1–19.
Brochure, 1985, The Timken Company, "Bearing Setting Techniques", pp. 1–24.

*Primary Examiner*—Thomas R. Hannon
*Attorney, Agent, or Firm*—Kokjer, Kircher, Bowman & Johnson

[57] ABSTRACT

A ring assembly for retaining a roller bearing and shaft. A split ring fits in a groove in the shaft and is surrounded by a lock ring to secure it in the groove. The split ring has a beveled surface which the lock ring acts against to force the split ring into the groove as the lock ring is pressed onto the split ring. An inclined surface on the split ring interacts with a ramp surface bounding the groove to press the split ring against the bearing as it moves into the groove. This applies a preload thrust to the bearing.

8 Claims, 3 Drawing Sheets

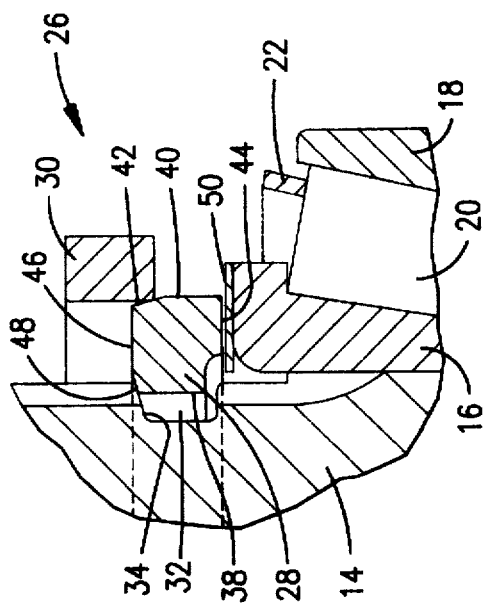
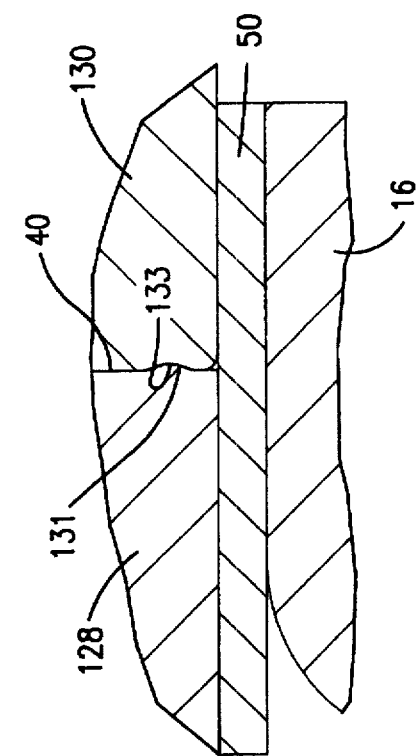
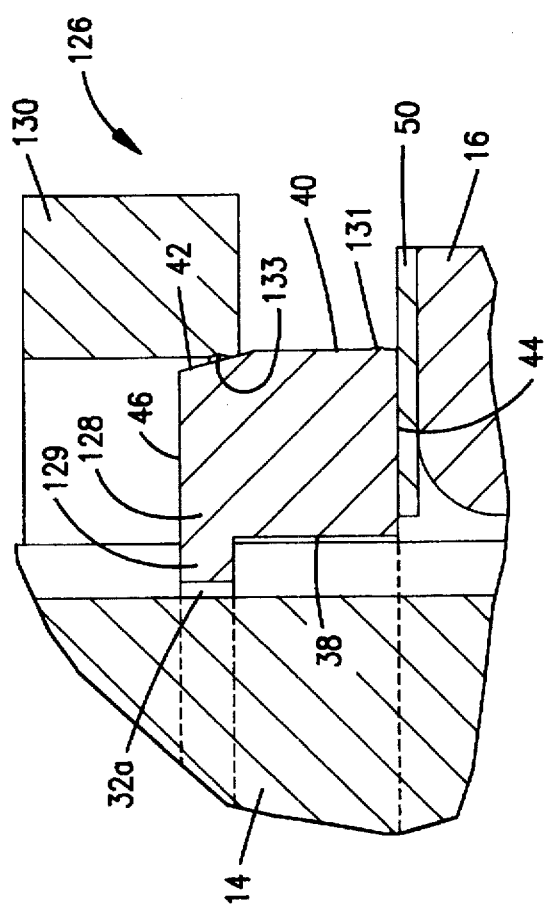

RETAINING ASSEMBLY FOR ROLLER BEARINGS

FIELD OF THE INVENTION

This invention relates generally to the retention of tapered roller bearings on shafts and more particularly to a double ring assembly which securely retains a bearing in place and may apply a preload thrust to the bearing.

BACKGROUND OF THE INVENTION

Planetary gear drive systems and other mechanisms make use of tapered roller bearings that must be retained in place axially on the shafts that rotate within them. Typically, a nut and lock washer are used for retention of the bearing, with the washer often having a tab that is bent into a slot in the nut. With this type of arrangement, the nut can loosen as a result of vibration or other forces. Particularly under conditions of high loading, the tab can break and allow the nut to work loose. The result is that the bearing is not properly retained, and the entire mechanism can break down.

Retaining rings that fit in grooves have also been used to retain bearings. However, the retaining ring is typically a split snap ring that relies upon a spring type force to hold it in the groove. Again, if high loads are encountered, the retaining ring can be dislodged from the groove, thus releasing the bearing and causing the drive mechanism to fail. This type of retention system is not capable of applying a significant axial preload on the bearing. Preloading of the bearings is advantageous in many applications such as when high radial bearing loads are encountered. Axial preloading of the bearings will distribute radial loads more evenly on the bearing rollers. This increases the bearing radial load capacity and makes a "stiffer" shaft support with less deflection under high load. Conventional retention systems can be shimmed to some extent in order to avoid undue play or back lash. However, applying a substantial preload to the bearings is not possible because of the practical problems that limit the number and thickness of shims that can be installed. Consequently, gear drives that are equipped with conventional bearing retention systems cannot always be constructed as stiffly as desired.

SUMMARY OF THE INVENTION

The present invention is directed to an improved assembly for retaining tapered roller bearings on shafts. The principal object of the invention is to provide a bearing retention system that functions more securely and reliably than other systems. Another object of the invention is to provide a bearing retention system that applies a preload force to the bearing, thus allowing the gear drive to exhibit more stiffness than is achieved with conventional retention systems.

In accordance with the invention, a split ring can be inserted into a groove in the circumference of the shaft to engage the inner race of the bearing and prevent relative axial movement between the shaft and bearing. A lock ring is fitted around the split ring to hold it in place in the groove. It is a particular feature of the invention that the lock ring and split ring interact through a beveled surface which forces the split ring into the groove as the lock ring is slipped onto the outside of the split ring.

In a particularly advantageous embodiment of the invention, the bearing is automatically preloaded as the split ring is forced into the groove. This is achieved by providing an inclined ramp surface on one side of the groove and a cooperating inclined surface on the split ring. These two surfaces interact in a manner to effect axial movement of the split ring as it is forced into the groove by application of the lock ring. The axial motion of the split ring in turn presses it against the bearing to assure the absence of backlash or "play" in the bearing and to apply a preload that stiffens the drive system or other mechanism of which the shaft and bearing are a part.

BRIEF DESCRIPTION OF THE DRAWINGS

In the accompanying drawings which form a part of the specification and are to be read in conjunction therewith and in which like reference numerals are used to indicate like parts in the various views:

FIG. 2 is a fragmentary sectional view similar to a portion of FIG. 1, but showing the lock ring of the system in a preassembled position where it is being initially applied to the split ring of the retention system;

FIG. 4 is an enlarged sectional view similar to a portion of FIG. 3, but showing the lock ring in a preassembled position in which it is being initially applied to the split ring; and FIG. 5 is a fragmentary sectional view on an enlarged scale showing the lower portions of the split ring and lock ring held by a detent arrangement.

DETAILED DESCRIPTION OF THE INVENTION

Figure 1:
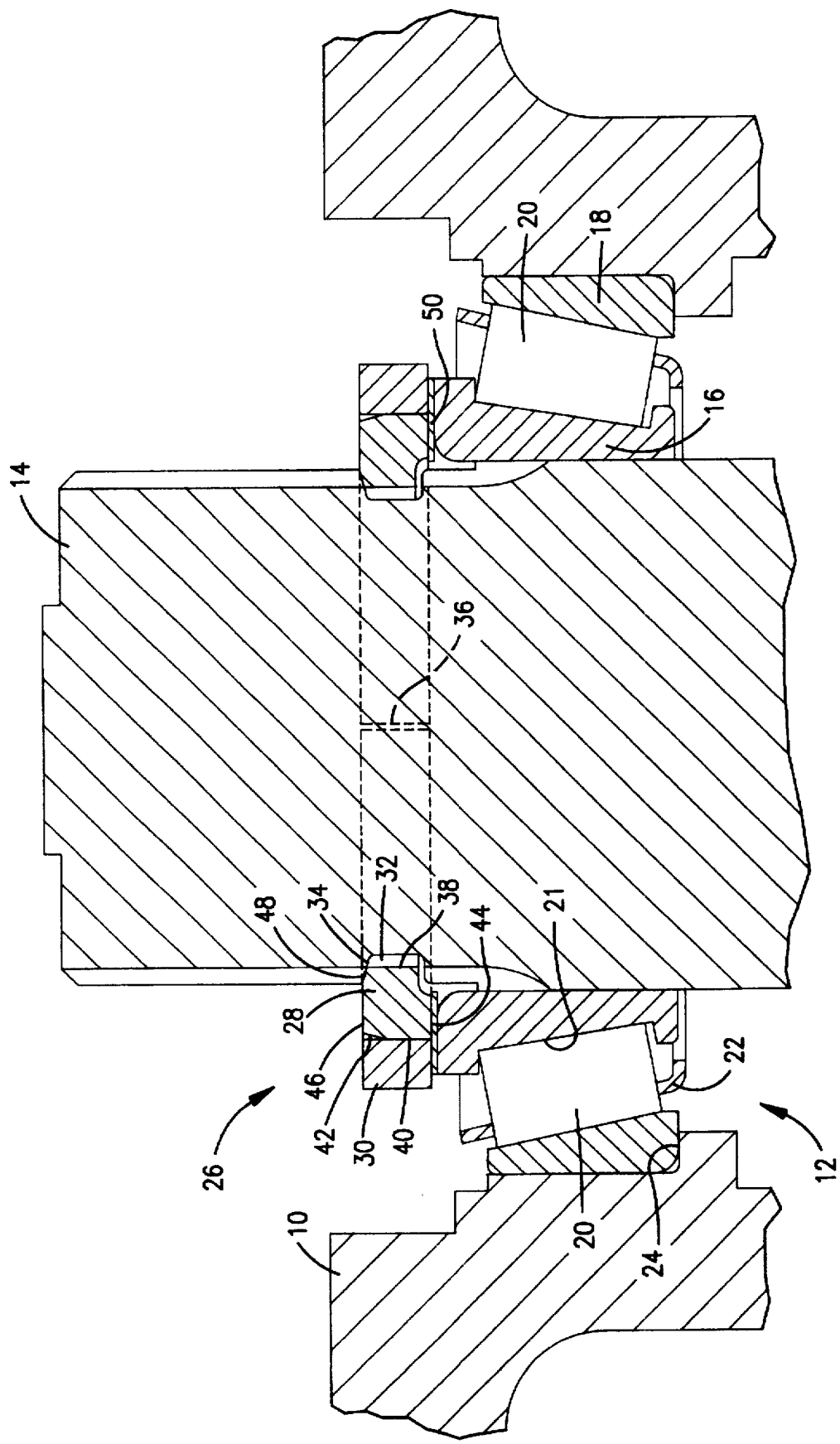
FIG. 1 is a fragmentary sectional view of a bearing retention system constructed according to one embodiment of the present invention applied to retain a bearing in place relative to a shaft supported by the bearing.

Referring now to the drawings in more detail and initially to FIG. 1, numeral 10 identifies a housing for a roller bearing 12 which supports a shaft 14 for rotation. The bearing 12 has an inner race or cone 16 adjacent to the shaft 14, an outer race or cup 18 adjacent to the housing, and a plurality of rollers 20 in a raceway 21 located between the inner and outer races. A cage 22 serves as a retainer which maintains the roller elements 20 spaced apart around the bearing 12. The outer race 18 butts up against a shoulder 24 formed on the housing 10 to retain the outer race against axial movement.

In accordance with the present invention, the bearing 12 and shaft 14 are retained against relative axial movement by a ring assembly which is generally identified by numeral 26. The ring assembly 26 includes a split ring 28 and a lock ring 30.

The shaft 14 is provided with a circumferential groove 32 which receives the split ring 28 when the retention assembly 26 is installed. The groove 32 is generally annular, and its upper side which is away from the bearing 12 is bounded by a ramp surface 34. The ramp surface 34 is inclined relative to the shaft radius. By way of example, the ramp surface 34 may be angled at approximately 15° relative to a radius of the shaft.

The split ring 28 is not a continuous member and has at least one split such as the split indicated at 36 in FIG. 1. The split ring 28 may be constructed of two or more separate arcuate members, with a split or gap 36 located between the adjacent ends of each of the arcuate members that make up the split ring.

The split ring 28 has an inside surface 38 which defines its inside diameter and extends into the groove 32 when the ring assembly 26 is fully installed. The inside surface 38 can extend well into the groove 32 before the splits 36 in the split ring are fully eliminated. The split ring 28 has an outer surface 40 defining its outside diameter. The upper portion of the outer surface 40 is beveled or arched at 42. Preferably, the beveled surface 42 is angled at approximately 15° to the remainder of the outer surface 40.

The split ring 28 also has a bottom surface 44 and a top surface 46. The bottom surface 44 is flat, while the majority of the top surface 46 is also flat. However, the inside portion of surface 46 near its intersection with the inside surface 38 is inclined as indicated at 48. The inclined surface 48 preferably is at an angle of about 15° relative to the remainder of the upper surface 46 of the split ring. Thus, the inclined surface 48 is at approximately the same angle as the ramp surface 34 and interacts with the ramp surface as will be explained more fully.

One or more shims 50 may be inserted between the bottom surface 44 of the split ring 28 and the top of the inner bearing race 16. Each shim 50 may take the form of a flat washer and serves the function of applying a preload to the bearing, as will be described more fully.

The lock ring 30 is a continuous solid ring. As shown in the drawings, the lock ring 30 may be rectangular in section. Alternatively, the lock ring may be provided near the bottom of its inside surface with a beveled surface (not shown) matching the beveled surface 42. The lock ring 30 is larger than the split ring so that it can be applied around the split ring as shown in FIG. 1. The inside diameter of the lock ring 30 is such that when the lock ring is applied to the outer surface 40, the split ring is extended into the groove 32 with the inside surface 38 projecting well into the groove.

The shaft 14 and bearing 12 are typically part of a gear drive which forms part of a planetary gear system or other mechanism. The bearing 12 is installed in the housing 10 with the outer race 18 seated on the shoulder 24. The shaft 14 extends within the inner race 16, and the retention assembly 26 is then installed to retain the shaft and bearing together.

Installation of the retention assembly involves first installing the desired number of shims 50 around the shaft and onto the top of the inner race 16. The split ring 28 is then installed by applying its segments around the shaft 14 and seating the bottom surface 44 on the shims 50. In this initial position, the split ring 28 projects only slightly into the groove 32.

The outer lock ring 30 is then applied around the shaft and lowered toward the split ring 28. The bottom inside corner of ring 30 initially engages the beveled surface 42 in the position shown in FIG. 2. The lock ring 30 is then pressed further downwardly onto the split ring, and its bottom inside corner rides along the beveled surface 42 until it has cleared the beveled surface and reaches the outer surface 40. As the lock ring 30 moves along the beveled surface 42, it forces the split ring 28 inwardly by wedging action such that the split ring is pressed into the groove 32. The diameter of the split ring 28 is reduced as this occurs, and this diameter reduction is accommodated by the splits 36 in the split ring.

As the split ring 28 is forced into the groove 32, its inclined surface 48 rides along ramp surface 34 on the top part of the groove. The interaction between these two inclined surfaces causes the split ring 28 to move downward or axially relative to the shaft as it progressively enters the groove 32. The axial force that is applied to the split ring is applied to the bearing 12 through the shim 50, thus applying a preload force that takes up any looseness, slack or "play" in the bearing or other components. The preloading of the bearing in this respect provides the drive system with stiffer operating characteristics.

When the lock ring 30 is fully installed, it extends around the outside of the split ring 28 and seats on top of the shim 50. This position of the lock ring prevents the split ring 28 from becoming displaced from the groove 32, and the ring assembly thus retains the shaft and bearing in position relative to one another. It is noted that the thickness of the ring assembly 26 is the combined thickness of the split ring 28 and the lock ring 30 so that the retention system exhibits considerable thickness and thus considerable strength.

After the lock ring 30 has been installed, a planetary carrier (not shown) or other device may be fitted over the shaft and abutted to the retention ring assembly 26 in order to prevent the lock ring 30 from being displaced axially from its locking position surrounding the split ring 28. A detent as shown in FIG. 5 (131,133), or other lock device, may also be employed to prevent the lock ring from moving axially. Consequently, the bearing and shaft are securely retained together for effective operation of the drive system.

Rather than providing the beveled surface 42 on the split ring, the lower portion of the inside surface of the lock ring 30 may be beveled. In either case, an inward wedging force presses the split ring 28 into the groove 32 when the lock ring is applied.

Figure 3:
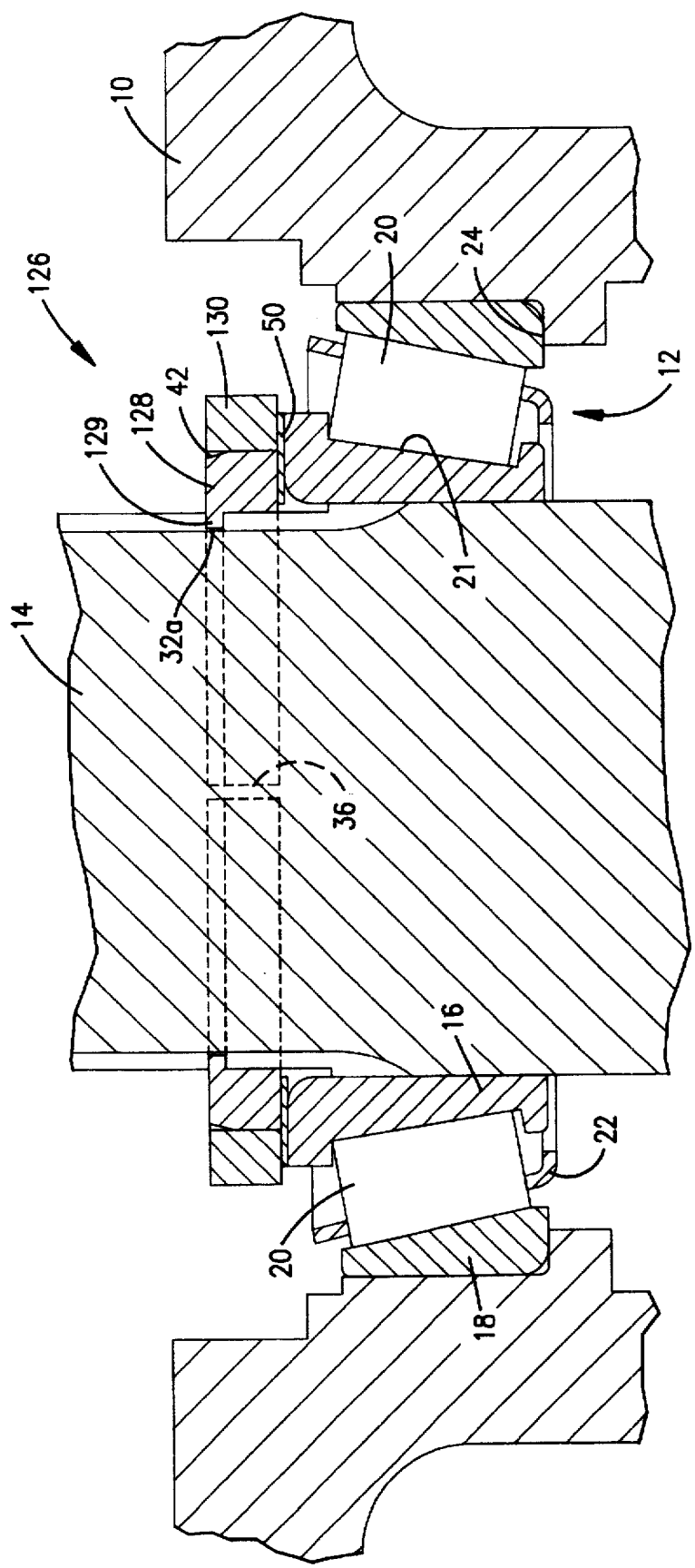
FIG. 3 is a fragmentary sectional view of a bearing retention system constructed according to another embodiment of the present invention applied to retain a bearing and shaft.

FIGS. 3-5 depict a modified embodiment of the invention which in many respects is similar to the embodiment depicted in FIGS. 1 and 2. The same reference numerals are used in FIGS. 3-5 for components that are comparable to those of FIGS. 1 and 2.

The embodiment of FIGS. 3-5 is intended for use with a system that has been equipped with a simple external retaining ring (not shown) that had been snapped into a small circumferential groove 32a in the shaft 14. This retaining ring is replaced by a retention ring assembly 126 which includes a split ring 128 and a lock ring 130.

The split ring 128 has an inwardly projecting angular flange 129 projecting from its inside surface. The split ring 128 does not have an inclined surface such as the surface 48 shown in FIGS. 1 and 2 because there is no ramp surface on the existing groove 32a. The lock ring 130 may be substantially identical to the ring 30 shown in FIGS. 1-2.

The retention ring assembly 126 is installed and functions in substantially the same manner as the retention assembly 26. The split ring 128 is extended around the shaft 14 and seated on one or more shims 50 with the flange 129 aligned with the groove 32a. The lock ring 130 is then installed around the shaft and lowered until its bottom inside corner engages the beveled surface 42 in the position shown in FIG. 4. As the lock ring 130 is progressively pressed downwardly onto the split ring 128, the bottom inside corner of the lock ring rides along the beveled surface 42 and thus forces the split ring 128 inwardly by wedging action. This causes the flange 129 to fully enter the groove 32a, thus securing the shaft 14 and bearing 12 in the manner previously described. When the lock ring 130 is fully applied, it extends completely around the outside of the split ring 128. Again, a planetary carrier or other device may be installed to secure the lock ring 130 in position around the split ring. Alternatively, as best shown in FIG. 5, the outside surface 40 of the lock ring 128 may be provided with an outwardly projecting bead 131 that fits in a mating groove 133 formed in the inside surface of the lock ring 130. The fit of the bead 131 in the groove 133 provides a detent which acts to retain the lock ring 130 in place on the split ring 128.

The retention ring assembly 126 differs from the retention ring assembly 26 primarily in that there is no wedging effect pressing the split ring 128 toward the bearing 12 for preloading of the bearing. It is possible to make use of shims 50 in order to avoid undue "play" in the bearing and to eliminate significant backlash. However, the assembly 126 is intended for use in retrofitting an existing system having a simple retention ring that likewise applies no preloading of the bearing. The assembly 126 is a considerable improvement with respect to its reliability in retaining the bearing in place and can be installed without requiring modifications of the existing shaft groove or other components.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, what is claimed is:

1. Apparatus for retaining a roller bearing on a shaft having a circumferential groove, comprising:

a split ring having an inside diameter to fit around the shaft and at least one split for accommodating reduction of said inside diameter to permit the split ring to enter the groove and retain the bearing;

a lock ring having a size to fit around said split ring to hold the split ring in the groove, one of said lock ring and split ring having a beveled surface thereon acting to force the split ring into the groove when said lock ring is applied onto said split ring;

an inclined ramp surface bounding said groove and being inclined relative to a radius of the shaft; and an inclined surface on said split ring engaging said ramp surface to move the split ring in a direction axially on the shaft toward the bearing as the split ring moves into the groove, thereby preloading the bearing.

2. Apparatus as set forth in claim 1, including a shim between said split ring and bearing.

3. In combination with a housing, a roller bearing having inner and outer races and roller elements therebetween with said outer race retained by the housing, and a shaft presenting a circumferential groove, a retaining assembly for the bearing comprising:

a split ring fitting around the shaft and presenting at least one split allowing said split ring to enter said groove and thereby retain the inner race of the bearing against movement in a direction axially on the shaft;

an outside circumferential surface on said split ring having a beveled portion; and a lock ring having an inside surface engageable against said beveled portion of said circumferential surface to force said split ring into the groove when said lock ring is pressed onto said split ring to extend around said circumferential surface;

an inclined ramp surface bounding said groove and being inclined relative to a radius of the shaft; and an inclined surface on said split ring engaging said ramp surface to move the split ring in a direction axially on the shaft toward the bearing as the split ring moves into the groove, thereby preloading the bearing.

4. A retaining assembly as set forth in claim 3, including a shim between said split ring and inner race.

5. An assembly for retaining a roller bearing on a shaft, comprising:

a circumferential groove in said shaft bounded by a ramp surface which inclines relative to a radius of the shaft;

a split ring for insertion into said groove, said split ring having inside and outside surfaces and at least one split to permit the split ring to surround the shaft and to be pressed into said groove;

an inclined surface on said split ring adjacent to the inside surface thereof for engagement against said ramp surface to force said split ring in a direction axially on the shaft against the bearing when the split ring is pressed into said groove;

a beveled portion of said outside surface of the split ring; and a lock ring having an inside surface applicable to said beveled portion to press the split ring into said groove when the lock ring is pressed onto the outside surface of the split ring, said inclined surface interacting with said ramp surface to preload the bearing as said split ring enters the groove.

6. An assembly as set forth in claim 5, including a shim between said split ring and bearing.

7. Apparatus for retaining a roller bearing on a shaft having a circumferential groove, comprising:

a split ring having an inside diameter to fit around the shaft and at least one split for accommodating reduction of said inside diameter to permit the split ring to enter the groove and retain the bearing, said split ring having a substantially cylindrical outside surface;

a lock ring having a size to fit around said split ring to hold the split ring in the groove, said lock ring having a substantially cylindrical inside surface for contacting said outside surface of the lock ring when said lock ring is applied onto said split ring;

a beveled surface adjacent one of said cylindrical surfaces acting to force the split ring into the groove when said lock ring is being applied onto said split ring, said cylindrical surfaces being in contact with one another when the lock ring is fully applied onto said split ring.

8. Apparatus for retaining a roller bearing on a shaft having a circumferential groove, comprising:

a split ring having an inside diameter to fit around the shaft and at least one split for accommodating reduction of said inside diameter to permit the split ring to enter the groove and retain the bearing;

a lock ring having a size to fit around said split ring to hold the split ring in the groove, one of said lock ring and split ring having a beveled surface thereon acting to force the split ring into the groove when said lock ring is applied onto said split ring; and releaseable means for retaining said lock ring on said split ring while allowing removal of the lock ring from the split ring.

* * * * *